United States Patent [19]

Gailey

[11] Patent Number: 4,825,893

[45] Date of Patent: May 2, 1989

[54] SOCKET ASSEMBLY WITH FUSIBLE ELEMENT

[75] Inventor: Edward D. Gailey, Mentor, Ohio

[73] Assignee: Tuthill Corporation, Cleveland, Ohio

[21] Appl. No.: 186,048

[22] Filed: Apr. 25, 1988

[51] Int. Cl.$^4$ .......................................... F16K 17/40
[52] U.S. Cl. ................................. 137/75; 251/149.6; 285/1; 285/316
[58] Field of Search ........................... 137/72, 74, 75; 251/149.6; 285/1, 315, 316

[56] References Cited

U.S. PATENT DOCUMENTS

| | | | |
|---|---|---|---|
| 3,245,423 | 4/1966 | Hansen et al. | 137/75 X |
| 3,427,047 | 2/1969 | Mayo | 285/3 |
| 3,532,101 | 10/1970 | Snyder, Jr. | 137/75 |
| 3,704,002 | 11/1972 | Skarzynski | 251/149.6 |
| 3,873,062 | 3/1975 | Johnson et al. | 251/149.6 |
| 3,897,087 | 7/1975 | Neilson | 285/363 X |
| 4,088,436 | 5/1978 | Alferes | 137/74 X |
| 4,280,523 | 7/1981 | Norton | 137/74 |
| 4,290,440 | 9/1981 | Sturgis | 137/75 |
| 4,610,564 | 9/1986 | Vantouroux | 285/316 X |
| 4,638,975 | 1/1987 | Iuchi et al. | 251/149.6 |

Primary Examiner—John Rivell
Attorney, Agent, or Firm—Tarolli Sundheim & Covell

[57] ABSTRACT

A coupling includes a socket assembly having a locking or retaining assembly which holds a plug in the socket assembly. When the socket assembly is exposed to excessive heat, an element of the retaining assembly starts to fuse and loses its rigidity. The heat fusible element of the retaining assembly is then deformed to release the plug for movement from the socket assembly. In one embodiment of the invention, the heat fusible element of the retaining assembly is spherical locking or retaining balls which engage the plug to hold it in the socket assembly. In another embodiment of the invention, the heat fusible element of the retaining assembly is cylindrical locking or retaining pins which engage the plug to hold it in the socket assembly. In still another embodiment of the invention, the heat fusible element of the retaining assembly is a cylindrical locking sleeve which engages the retaining elements to hold them in engagement with the plug.

19 Claims, 5 Drawing Sheets

SOCKET ASSEMBLY WITH FUSIBLE ELEMENT

BACKGROUND OF THE INVENTION

The present invention relates to a new and improved coupling which is utilized to interconnect a pair of conduits. More specifically, the invention relates to a coupling having a socket assembly with a heat fusible element which fuses upon exposure to excessive heat to enable a plug to be withdrawn from the socket assembly.

During the use of gas appliances, such a cooking stoves and other devices, there is an ever present danger of a fire which will travel through the conduits to a source of flammable gas. In order to prevent this from happening, couplings have been provided with a safety cutoff which closes a valve to block a flow of gas to the appliance upon heating of the coupling. Known couplings which may be used in such an environment and having safety cutoff devices which respond to exposure of the coupling to excessive heat are disclosed in U.S. Pat. Nos. 3,245,423; 3,532,101; 4,280,523.

A coupling disclosed in U.S. Pat. No. 4,280,523 includes a plug which is telescopically received in a socket assembly. The socket assembly has a plurality of locking elements which engage an annular collar or ring disposed on a plug body to hold the plug and socket assembly against movement relative to each other. When the coupling is heated to a predetermined temperature, the plug body is released from the collar and is ejected from the socket assembly. At the same time, a valve in the socket assembly is closed to block the flow of gas or other fluid through the coupling.

In order to release the plug body of U.S. Pat. No. 4,280,523 from the collar when the coupling is heated to the relatively high temperature, a body of fusible material is utilized to connect the collar with the plug body. When a fire or other condition heats the coupling to a predetermined temperature, the body of material fuses so that it is no longer effective to hold the collar and plug body against movement relative to each other. When this occurs, a spring in the socket assembly moves a valve to a closed condition and causes the valve to push the plug body out of the socket assembly. When this happens, both the fluid connection and the physical connection between the two conduits is interrupted to prevent further spreading of a fire.

SUMMARY OF THE PRESENT INVENTION

The present invention provides a new and improved coupling which is used to connect a pair of conduits in fluid communication. Upon being exposed to excessive heat, the coupling interrupts fluid communication between the conduits. The coupling includes an improved socket assembly having a socket body with a chamber into which a plug is inserted. The socket assembly also has a locking or retaining assembly which retains the plug in the socket body.

The retaining assembly includes a retaining or locking element which is movable relative to the socket body between an engaged condition and a disengaged condition. When the retaining element is in the engaged condition, it extends into the chamber in the socket body to engage the plug and retain the plug in the chamber. When the retaining element is in the disengaged condition, it is ineffective to retain the plug in the socket body. A sleeve is movable relative to the socket body. As the sleeve moves relative to the socket body, the retaining element moves between the engaged and disengaged conditions.

In accordance with a feature of the invention, at least a portion of the retaining assembly is formed of a heat fusible material. When the coupling is exposed to excessive heat, this material starts to melt or fuse and loses its rigidity. When this occurs, the heat fusible material is deformed and the plug moved at least part way out of the socket chamber.

The heat fusible portion of the retaining assembly may be the retaining element. Prior to exposure to excessive heat, the retaining element transmits force to hold the plug in the chamber. When the socket assembly is exposed to excessive heat, the retaining element fuses and loses its rigidity. When this happens, the force transmitted by the retaining element deforms the retaining element to release the plug.

In another embodiment of the invention, the heat fusible portion of the locking or retaining assembly is the sleeve. Prior to exposure to excessive heat, the sleeve holds the retaining element in engagement with the plug. When the socket assembly is exposed to excessive heat, at least a portion of the sleeve fuses and loses its rigidity. When this happens, the sleeve is deformed by force transmitted from the plug to the sleeve by the retaining elements. As the sleeve is deformed, the retaining element moves from the engaged condition to the disengaged condition.

Accordingly, it is an object of this invention to provide a new and improved socket assembly having a retaining assembly with a heat fusible element which fuses upon exposure to excessive heat to enable a plug to be withdrawn from the socket assembly.

Another object of this invention is to provide a new and improved coupling having a socket assembly with a retaining element which is engageable with a plug to hold the plug in a socket chamber and wherein the retaining element fuses and deforms upon exposure to excessive heat to release the plug.

Another object of this invention is to provide a new and improved coupling having a socket assembly with a sleeve which holds a retaining element in engagement with a plug and wherein the sleeve fuses and deforms upon exposure to excessive heat to release the plug.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Coupling—General Description

A coupling 10 (FIG. 1), constructed in accordance with the present invention, is utilized to connect a pair of conduits (not shown) in fluid communication with each other. The coupling 10 includes a metal plug 12 which is telescopically received in an improved socket assembly 14. An externally threaded metal end portion 16 of the plug 12 is connected with a fluid conduit. An externally threaded metal end portion 18 of the socket assembly 14 is connected with a second fluid conduit. When the plug and socket assemblies 12 and 14 are interconnected in the manner shown in FIG. 1, the fluid conduits are connected in fluid communication with each other through the coupling 10.

The socket assembly 14 includes a generally cylindrical metal socket body 22. A socket chamber 24 is formed in the socket body 22 and telescopically receives the plug 12. Although the socket body 22 has been illustrated in FIG. 1 as being formed of two interconnected metal sections, it is contemplated that the socket body 22 could be formed as one piece if desired. In the illustrated embodiment of the invention, the plug 12 and socket body 22 are formed of brass. However, other metals could be used if desired.

A valve assembly 28 is provided in the socket chamber 24 to block fluid flow through the socket assembly 14 when the plug 12 is disconnected from the socket assembly. The valve assembly 28 includes a brass valve member 30 which is urged toward an annular seal ring 32 by a steel valve spring 34. When the plug 12 is disposed in the socket assembly 14 (FIG. 1), a flat outer end portion 36 of the valve member 30 engages a leading end portion 37 of the plug 12 to hold the valve member in the open position against the influence of the valve spring 34. When the valve member 30 is in the open position, fluid can flow around a circular flange or head portion 38 of the valve member, past the flat outer end portion 36, and into the plug 12 and a conduit connected with the plug. The construction of the valve member 30 is the same as a similar valve member in U.S. Pat. No. 2,805,089.

Figure 1:
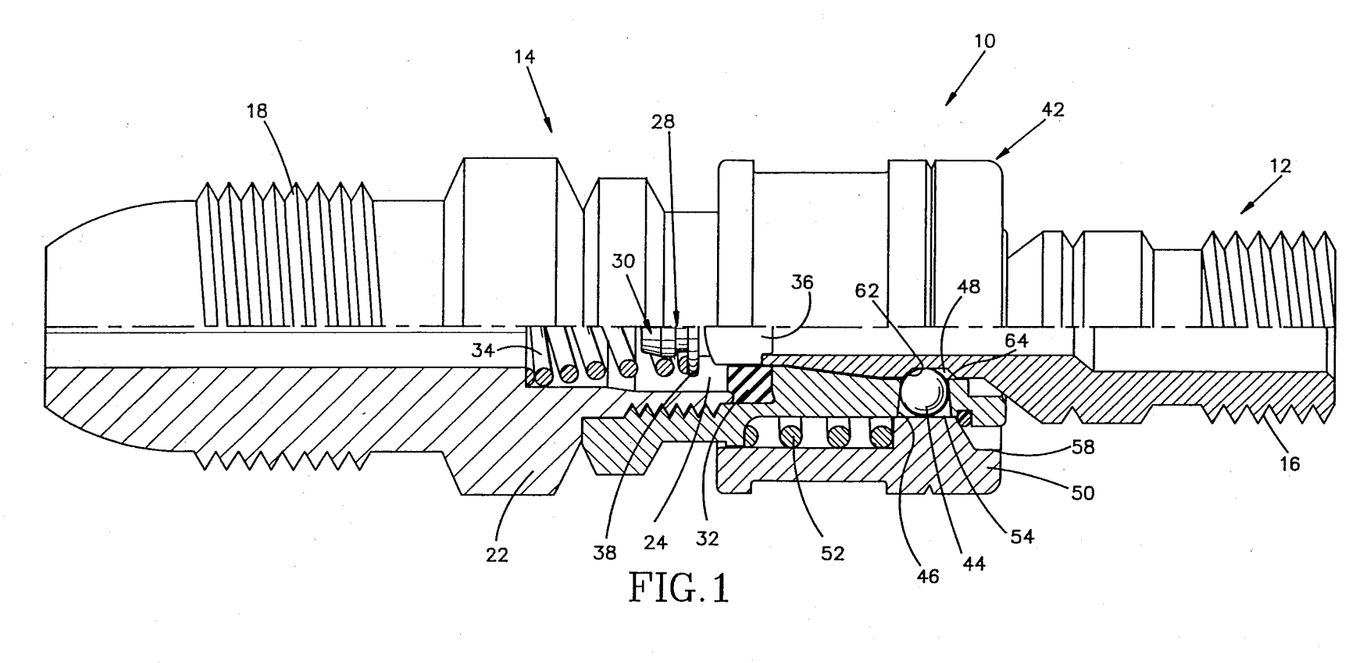
FIG. 1 is a partially broken away view illustrating the manner in which a plug is received in a socket assembly to connect a pair of conduits in fluid communication.

A retaining or locking assembly 42 holds the plug 12 in the socket assembly 14 against the influence of forces tending to separate the plug from the socket assembly. The retaining assembly 42 includes a plurality of locking or retaining elements 44 which are mounted in openings 46 formed in the socket body 22. Although only one of the retaining elements 44 is shown in FIG. 1, a plurality of retaining elements 44 are disposed in an annular array about the socket body 22. In one specific embodiment of the invention illustrated in FIG. 1, there are three equally spaced retaining elements 44 mounted on the socket body 22. Of course, either a greater or lesser number of retaining elements 44 could be provided if desired.

The retaining elements 44 extend into the socket chamber 24 and engage an annular groove 48 formed in the plug 12. A cylindrical sleeve 50 is slidably mounted on the socket body 22 and circumscribes the annular array of retaining elements 44. A steel sleeve spring 52 urges the retaining sleeve 50 to the engaged or locking position shown in FIG. 1. In this portion, a cylindrical inner surface 54 on the sleeve 50 abuts the outside of the retaining elements 44. This enables the sleeve 50 to hold the retaining elements 44 in engagement with the groove 48 in the plug 12 against the influence of outwardly directed forces applied to the retaining elements by a side of the plug groove.

When the sleeve 50 is retracted, that is, moved toward the left as viewed in FIG. 1, an annular recess 58 in the sleeve moves into alignment with the retaining elements 44. This releases the retaining elements 44 so that they can move out of the groove 48 in the plug 12. The plug 12 can then be withdrawn from the socket chamber 24.

When the sleeve 50 and retaining elements 44 are in the engaged condition shown in FIG. 1, a rightward (as viewed in FIG. 1) biasing force is transmitted from the valve spring 34 to the valve member 30 and from the valve member 30 to the plug 12. This biasing force is resisted by the retaining elements 44. Thus, an annular sloping slide surface 62 of the groove 48 applies a camming force against the retaining elements 44 urging each of the retaining elements to move outwardly away from the coincident central axes of the plug 12 and socket assembly 14. This outward force is resisted by the cylindrical inner side surface 54 of the sleeve 50.

In addition, the sloping side surface 62 of the groove 48 applies an axial force against the retaining elements 44. This axial force presses each of the retaining elements against a right (as viewed in FIG. 1) edge portion 64 of an opening 46 in the socket body 22. Thus, forces applied to the retaining elements 44 by the plug 12 are resisted by the socket body 22 and sleeve 50 to maintain the plug in the socket chamber 24 against the influence of any forces tending to separate the plug and socket assembly 14.

The retaining elements 44 are subjected to a shear stress by the plug 12 and socket body 22. Thus, the annular side surface 62 of the groove 48 in the plug 12 applies rightward (as viewed in FIG. 1) forces against the inner portions of the retaining elements 44. The outer portions of the retaining elements 44 are subjected to leftward reaction force by edge portions 64 of the openings 46 in the socket body 22. During normal conditions, the retaining elements 44 and sleeve 50 withstand the forces tending to separate the plug 12 and socket assembly 14. Although the foregoing explanation has been in regard to the force applied by the valve spring 34, it should be understood that there may be other forces tending to separate the plug 12 and socket assembly 14. For instance, a pulling or tension force on a conduit connected with the plug 12.

To disconnect the plug 12 from the socket assembly 14, the locking sleeve 50 is axially retracted to move the annular groove 58 into alignment with the annular array of retaining elements 44. The force applied against the retaining elements 44 by the sloping side surface 62 of the groove 48 moves them outwardly into the annular recess 58 in the sleeve 50. This releases the plug 12 for withdrawal from the socket chamber 24.

As the plug 12 is withdrawn from the socket chamber 24, the valve member 30 moves from the open position shown in FIG. 1 toward a closed position in which an annular side surface on the flange 38 sealingly engages an annular side surface on the seal ring 32. The valve spring 34 then holds the valve member 30 against the seal ring 32 to block fluid flow through the socket assembly 14. The plug 12 is then completely removed from the socket chamber 24. As the withdrawal of the plug 12 from the socket chamber 24 is completed, the locking sleeve 50 is released for movement back to the extended position shown in FIG. 1 under the influence of the coil spring 52.

When the plug 12 is to be reinserted in the socket assembly 14, the locking sleeve 50 is again retracted against the influence of the spring 52 to move the annular recess 58 into alignment with the retaining elements 44. The leading end portion of the plug 12 is then telescopically inserted into the socket chamber 24. As the plug is inserted into the socket chamber, the retaining elements 44 are cammed or forced radially outwardly and the leading end of the plug moves into engagement with the valve member 30.

Continued inward movement of the plug 12 moves the valve member 30 from the closed position toward the open position illustrated in FIG. 1. As the inward movement of the plug 12 is completed, the retaining elements 44 move into radial alignment with the annular groove 48 and the valve member 30 moves to the fully open position of FIG. 1. The retaining sleeve 50 is then released and the biasing spring 52 forces the sleeve axially outwardly to the engaged position of F. 1. As the retaining sleeve 50 moves outwardly, the retaining elements 44 are forced into the groove 48 in the plug 12 and held there by the cylindrical inner side surface 54 on the sleeve.

Heat Fusible Element

In accordance with a feature of the present invention, one or more of the elements of the retaining assembly 42 are formed of a heat fusible material. Therefore, when the plug and socket assembly 12 and 14 are interconnected (FIG. 1) and are exposed to excessive heat, one or more elements of the retaining assembly 42 fuses to release the plug 12 for movement from the socket chamber 24. As the plug 12 moves out of the socket chamber 24, the valve assembly 28 closes to block fluid flow through the socket assembly 14. Therefore, both the fluid connection and the physical connection between conduits connected with the plug 12 and socket assembly 14 are interrupted upon fusing of an element in the retaining assembly 42.

In the embodiment of the invention illustrated in FIG. 1, the retaining elements 44 are formed of heat fusible material and the sleeve 50 is formed of brass. When the coupling 10 is exposed to excessive heat, the retaining elements 44 start to melt or fuse and lose their rigidity. The force applied against the retaining elements 44 by the plug 12 and socket body 22 deform the retaining elements to release the plug for movement under the influence of the valve biasing spring 34.

Figure 3:
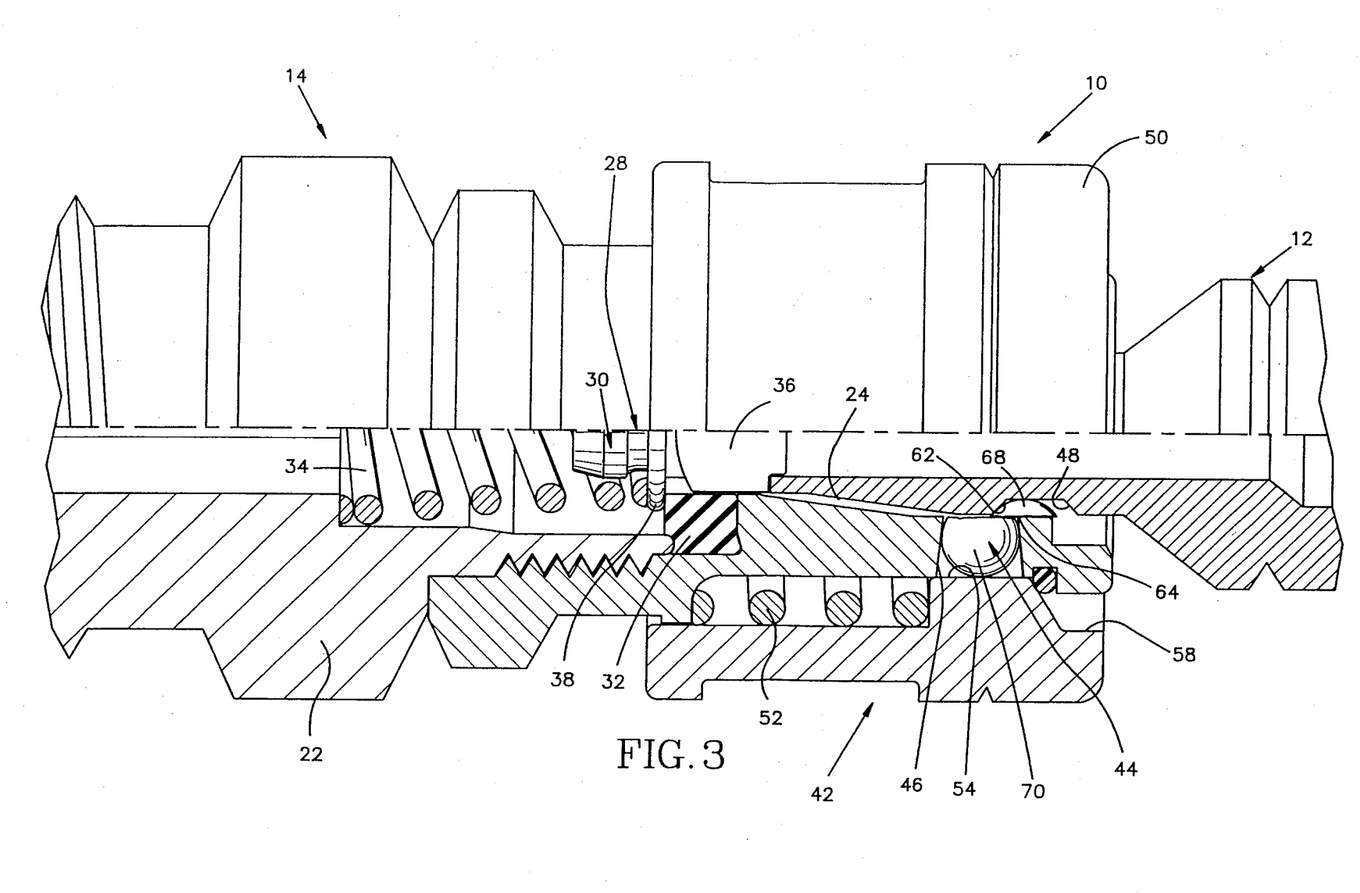
FIG. 3 is a partially broken away sectional view, generally similar to FIG. 2, illustrating the manner in which a valve closes in the socket assembly as the fused retaining element is further deformed.

As the retaining elements 44 fuse and are deformed, the valve member 30 is moved from an open condition (FIG. 1) to a closed condition (FIG. 3). When the valve member 30 is in the closed condition, it is held in sealing engagement with the annular seal ring 32 by the biasing spring 34. Therefore, whenever the coupling 10 is exposed to excessive heat, fluid flow through the coupling is blocked.

To provide for fusing and subsequent deformation of the retaining elements 44 when they are exposed to excessive heat, the retaining elements 44 are formed of a polymeric material. This polymeric material loses its rigidity and is reduced to a plastic state when it is heated to a temperature in excess of 200° F. It is believed that this feature will be particularly advantageous when the coupling 10 is used in association with flammable fluids.

Prior to being exposed to excessive heat, the retaining elements 44 are rigid. The rigid retaining elements 44 transmit force from the plug 12 to the socket body 22 to hold the plug in the socket body against the influence of the valve spring 34 and other forces. At this time, the retaining elements 44 have sufficient rigidity or shear strength to resist the shear stresses to which they are subjected.

When the coupling 10 is exposed to excessive heat, that is after being heated to a temperature of at least 200° F., the retaining elements 44 start to fuse. As the retaining elements 44 begin to fuse or melt, they lose their rigidity and shear strength. The loss in shear strength enables the force transmitted from the valve spring 34 through the valve 30 to the plug 12 and socket body 22 to deform the retaining elements 44 with a shearing action. This shearing action is the result of the rightward (as viewed in FIG. 1) force applied against the retaining elements 44 by the plug 12 and the leftward (as viewed in FIG. 1) reaction force applied against the retaining elements by the socket body 22.

As the retaining elements 44 are deformed with a shearing action, inner portions 68 of the retaining elements 44 (FIG. 2) tend to be severed from outer portions 70 of the retaining elements. Thus, as the retaining elements 44 begin to melt or fuse, they lose their structural strength or rigidity. At this time, a rightward force (as viewed in FIG. 2) is transmitted from the valve biasing spring 34 and applied against the inner portions 68 of the retaining elements 44 by the sloping annular side surface 62 of the groove 48 in the plug 12. This rightward force tends to move the inner portions 68 of the retaining elements toward the right relative to the outer portions 70 of the retaining elements. The outer portions 70 (FIG. 2) of the retaining elements 44 are held against movement with the inner portions 68 by engagement with the sides of the openings 46 formed in the plug body 22. This results in the retaining elements 44 tending to be severed or sheared into two sections, in the manner illustrated schematically in FIG. 2.

Figure 2:
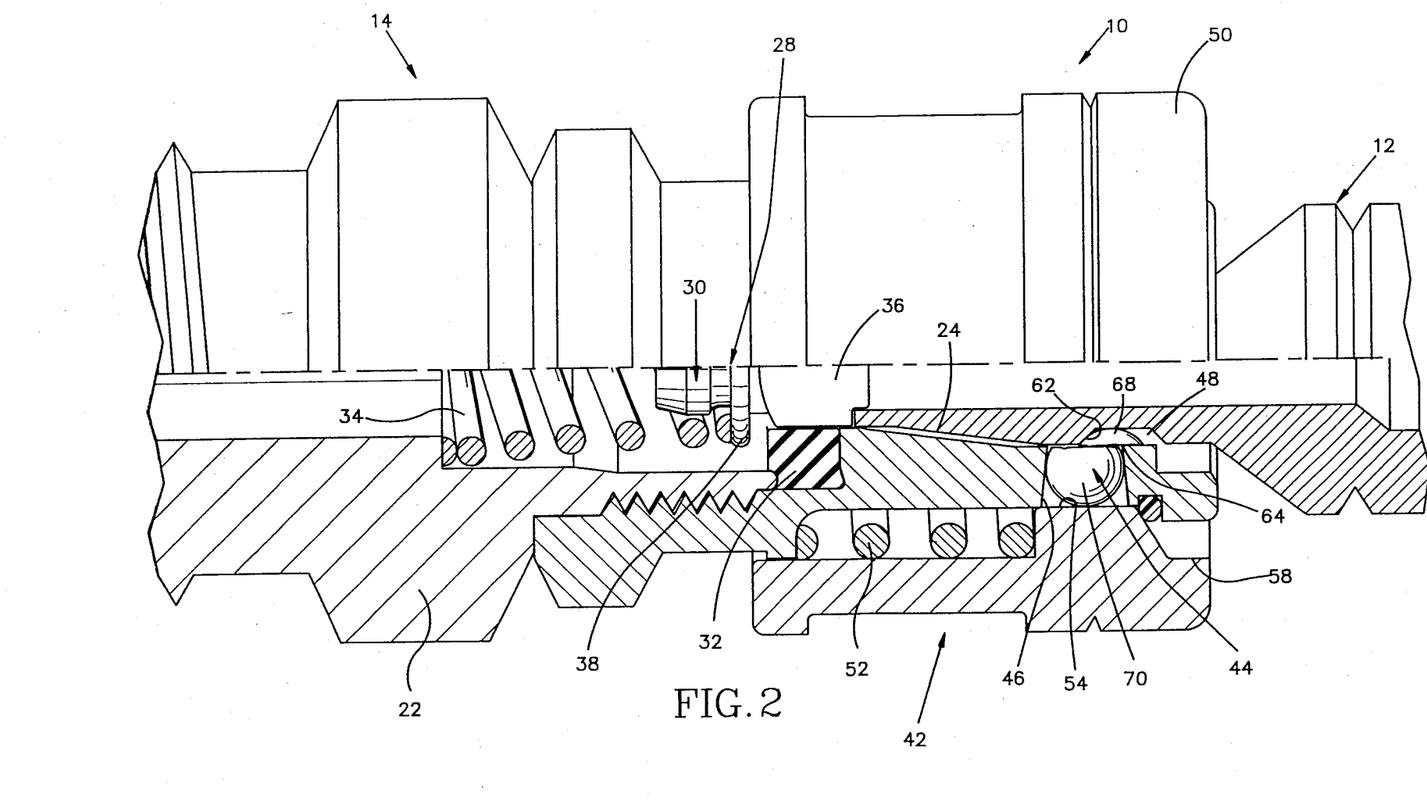
FIG. 2 is an enlarged fragmentary view illustrating the manner in which a retaining or locking element of the socket assembly fuses and deforms upon being exposed to excessive heat.

It should be understood that the manner in which the retaining elements 44 deform may be substantially different than that illustrated schematically in FIG. 2. Thus, rather than having a clear severing of the retaining elements 44 into separate inner and outer portions 68 and 70, there may be a pliable yielding of the material of the retaining elements as they fuse.

As the retaining elements 44 are deformed by the interaction between the plug 12 and socket body 22, the valve member 30 moves to the closed position illustrated in FIG. 3. As the valve member 30 moves to the closed position, the annular head flange 38 on the valve member 30 moves into sealing engagement with a flat annular side surface of the seal ring 32. This enables the valve member 30 to block fluid flow through the socket assembly 14. As the valve member 30 closes, each of the retaining elements 44 is severed into two separate pieces, in the manner indicated schematically in FIG. 3, to release the plug 12 for withdrawal from the socket chamber 24.

In one specific embodiment of the coupling 10, all the retaining elements 44 were formed of an acetal plastic, specifically "DELRIN". This specific plastic material is fused at a temperature of approximately 350° F. Although for certain uses a fusing temperature of 350° F. with a resulting closing of the valve member 30 may be satisfactory, it is contemplated that the coupling 10 will be used in environments wherein fusing of the retaining elements 44 and the resulting closing of the valve member 30 occurs at a temperature of 200° F. to 250° F. When the retaining elements 44 are to fuse and the valve member 30 close at a relatively low temperature of 200° F. to 250° F., the retaining elements 44 may be formed of a material other than an acetal plastic. For instance, the retaining elements 44 may be formed of an acrylic plastic having the required low fusing temperature. Of course, the retaining elements could be formed of other known polymeric materials if desired as long as the retaining elements have the requisite strength prior to being exposed to excessive temperatures.

In the specific embodiment of the invention illustrated in FIGS. 1–3, all the retaining elements 44 were formed of DELRIN. In this embodiment of the invention, all the retaining elements 44 had a spherical or ball shaped configuration. When the plug 12 and socket assembly 14 are interconnected prior to exposure to excessive heat, a radially inner portion 68 of each of the retaining elements 44 engages the groove 48 in the plug 12 and a radially outer portion 70 of each of the retaining elements engages an opening 46 in the socket body 22. In this embodiment of the invention, there are three spherical retaining elements 44 arranged in a circular array. The retaining elements 44 engage the annular groove 48 in the plug 12 to hold the plug in the socket assembly in a manner similar to that disclosed in U.S. Pat. Nos 2,518,542 and 2,548,528.

Second Embodiment

Figure 4:
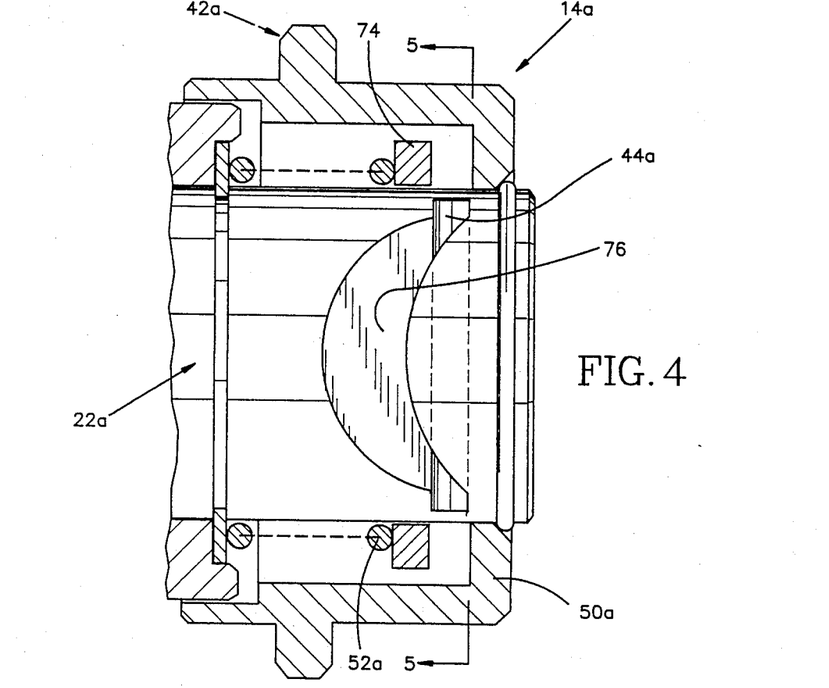
FIG. 4 is a fragmentary sectional plan view of a second embodiment of the invention and illustrating the manner in which a locking or retaining pin formed of heat fusible material is mounted on a socket body.
Figure 5:
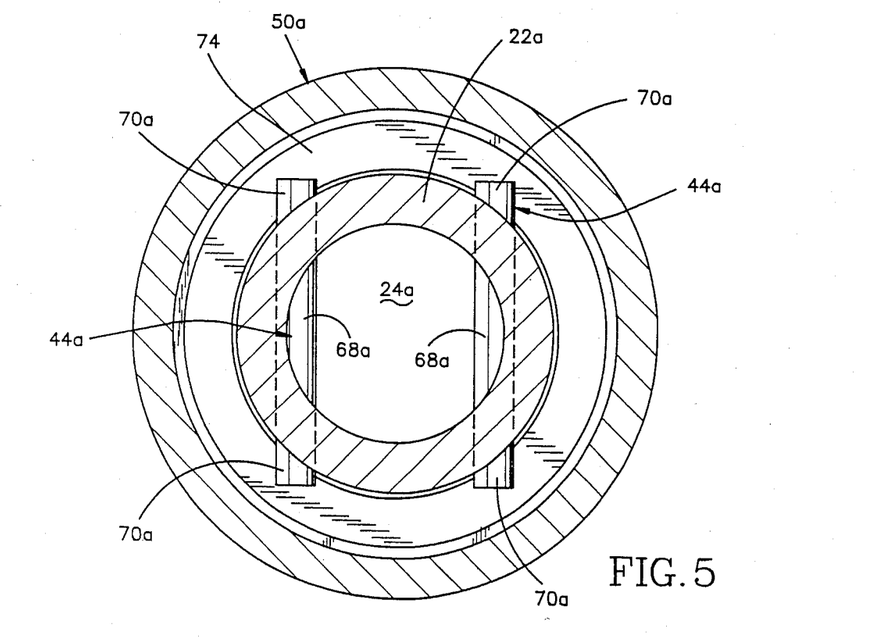
FIG. 5 is a sectional view, taken generally along the line 5—5 of FIG. 4, illustrating the relationship between a pair of heat fusible retaining pins.

In the embodiment of the invention illustrated in FIGS. 1–3, the retaining elements 44 have a spherical configuration. However, it is contemplated that the retaining elements 44 could have other configurations. In the embodiment of the invention shown in FIGS. 4 and 5, the retaining elements have a cylindrical or pin shaped configuration. Since the embodiment of the invention illustrated in FIGS. 4 and 5 is generally similar to the embodiment of the invention illustrated in FIGS. 1–3, similar numerals will be utilized to designate similar components, the suffix letter "a" being associated with the numerals of FIGS. 4 and 5 to avoid confusion.

The socket assembly 14a includes a metal socket body 22a. A retaining assembly 42a is mounted on the socket body 22a and includes a plurality of retaining elements 44a. The retaining elements 44a are enclosed by a cylindrical metal sleeve 50a. A metal biasing spring 52a presses an annular metal ring 74 against the retaining elements 44a. The socket assembly 14a has the same construction and cooperates with a plug in the same manner as described in U.S. Pat. No. 4,676,269. However, the retaining assembly 42a could be used with a plug and socket assembly having a different construction if desired.

In accordance with a feature of this embodiment of the invention, the retaining elements 44a are cylindrical pins. In this embodiment of the invention, there are two retaining pins 44a having parallel central axes. However, it is contemplated that there could be a greater number of retaining elements 44a and that they could have a configuration somewhat different from that shown in FIGS. 4 and 5. Thus, the pins could have a configuration similar to that shown in U.S. Pat. No. 3,423,110.

Each retaining pin 44a is received in a slot 76 (FIG. 4) formed in the socket body 22a. The identical slots slope axially outwardly along the central axis of the socket body 22a, that is toward the right as viewed in FIG. 4, and radially inwardly toward the central axis of the socket body. An inner portion 68a of each of the cylindrical pins 44a extends into a socket chamber 24a (FIG. 5). Outer portions 70a of the pins project from the slot formed in the socket body 22a and are engaged by the metal ring 74.

When a plug is to be inserted into the socket assembly 14a, the metal locking sleeve 50a is retracted or moved toward the left as viewed in FIG. 4. This moves the retaining elements 44a outward in their slots 76 so that the retaining elements no longer extend into the socket chamber 24a. The plug can then be inserted into the socket chamber 24a. Once this has been done, the retaining sleeve 42a is released and the biasing spring 52a urges the retaining elements or pins 44a back to the position shown in FIGS. 4 and 5.

When the socket assembly 14a is exposed to excessive heat, the retaining pins 44a fuse and are deformed by an axial force applied to the plug by a valve spring (not shown). Thus, when the retaining elements or pins 44a are exposed to excessive heat, the retaining elements start to melt or fuse and lose their structural strength or rigidity. The force applied against the plug by the socket valve is then effective to deform the retaining elements 44a with a shearing action. Thus, the inner portion 68a of each of the pins tends to be sheared from the outer portions 70a when the retaining elements are exposed to excessive heat.

In the embodiment of the invention illustrated in FIGS. 4 and 5, all of the retaining elements 44a are formed of an acetal plastic material which fuses or begins to melt at a temperature of approximately 350° F. However, it is contemplated that other polymeric material could be used if desired. When the socket assembly 14a is used in certain environments, it is believed that the retaining elements 44a will advantageously be formed of a polymeric material which begins to fuse or melt at a relatively low temperature of 200° F. to 250° F.

In the embodiment of the invention shown in FIGS. 4 and 5, the end portions 70a of the retaining elements 44a project from the socket body 22a. It is contemplated that the retaining pins could be enclosed within recesses in the socket body and held in place by a locking or retaining sleeve if desired. A coupling having this construction is disclosed in U.S. Pat. No. 3,423,110. Of course, the retaining pins would be formed of a heat fusible material.

In each of the embodiments of the invention shown in FIGS. 1–5 there are a plurality of retaining elements 44 or 44a. It is contemplated that a single retaining element, such as a ring, could be used. At least a portion of this single retaining element would be formed of heat fusible material.

Third Embodiment

In the embodiment of the invention illustrated in FIGS. 1–5, the retaining sleeve 50 or 50a is formed of brass and the retaining elements 44 or 44a are formed of a material which is fusible upon exposure to excessive heat to enable a brass plug to be withdrawn from a socket assembly. In the embodiment of the invention illustrated in FIG. 6, the retaining elements are formed of a metal which does not fuse at relatively low temperatures and the sleeve is formed of a material which fuses or begins to melt at relatively low temperatures. Since the embodiment of the invention illustrated in FIG. 6 is generally similar to the embodiment of the invention illustrated in FIGS. 1-5, similar numerals have been utilized to identify similar components, the suffix letter "b" being associated with FIG. 6 in order to avoid confusion.

The coupling 10b includes a brass plug 12b which is telescopically received in a socket assembly 14b. The socket assembly 14b includes a brass socket body 22b and a retaining or locking assembly 42b. A valve assembly 28b is provided in a socket chamber 24b. The valve assembly 28b is operable between the open condition shown in FIG. 6 in a closed condition.

Figure 6:
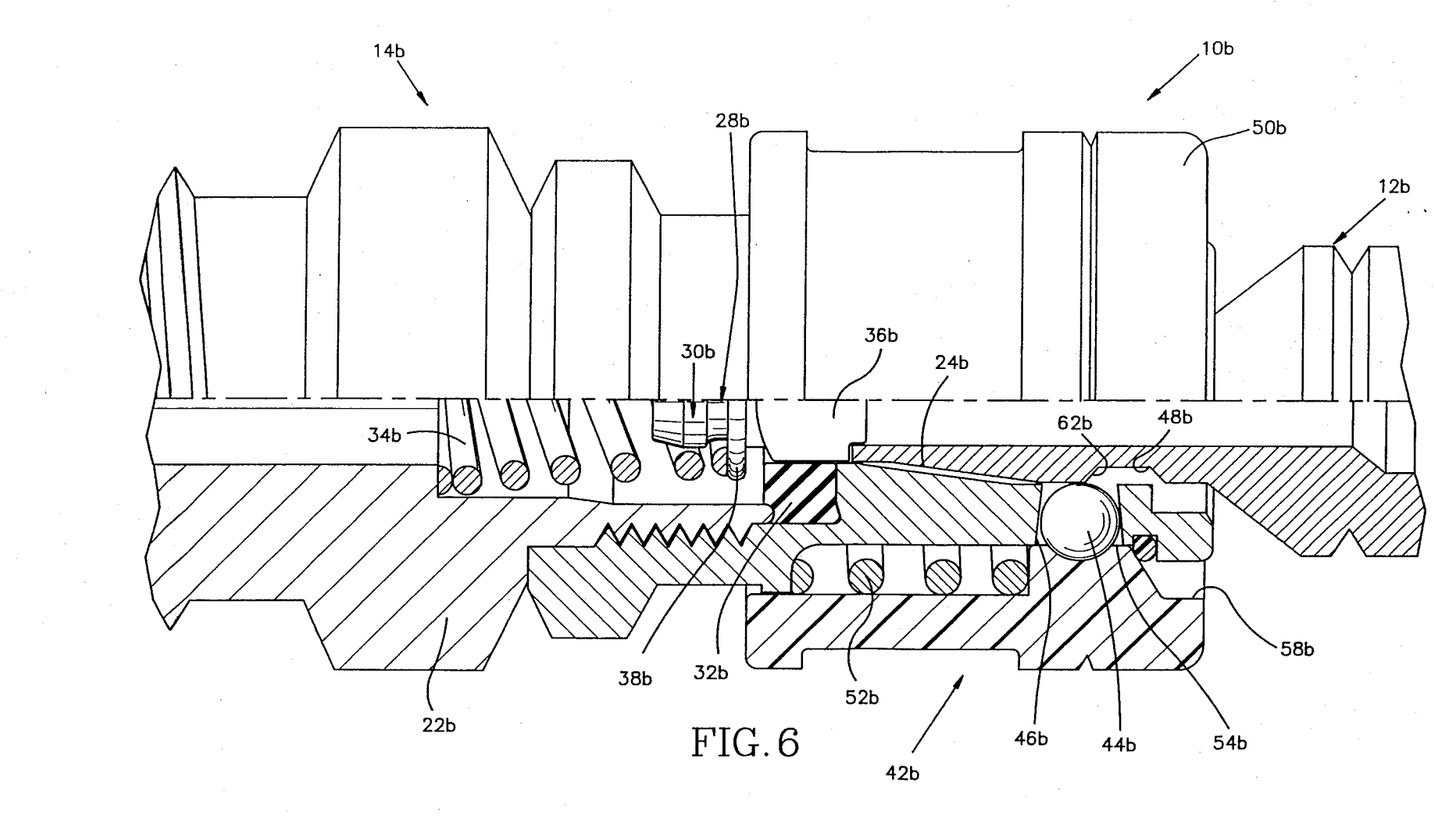
FIG. 6 is an enlarged fragmentary sectional view of a third embodiment of the invention, illustrating the manner in which a heat fusible sleeve is deformed to release a plug upon exposure to excessive heat.

When the valve assembly 28b is in the open condition of FIG. 6, fluid can flow through the socket assembly 14b. When the valve assembly 28b is in the closed condition, an annular flange 38b on a brass valve member 30b engages a seal ring 32b to block fluid flow through the socket assembly 14b. The valve member 30b is urged toward the closed position by a steel coil spring 34b.

The locking assembly 42b includes a plurality of spherical metal retaining elements or balls 44b which are engageable with an annular groove 48b formed in the plug 12b to hold the plug in the socket chamber 24b in the manner explained in conjunction with the embodiment of the invention illustrated in FIGS. 1-3. The annular side surface 62b of the groove 46b in the plug 12b applies force against the retaining elements 44b tending to move the retaining elements out of engagement with the plug. The steel retaining elements 44b are held in the groove 48b by engagement with a cylindrical inner side surface 54b of a locking or retaining sleeve 50b. The cylindrical retaining sleeve 50b is urged toward an engaged position by a steel coil spring 52b.

In accordance with a feature of this embodiment of the invention, the cylindrical retaining sleeve 42b fuses and is deformed when the socket assembly 14b is exposed to excessive heat, in the manner illustrated schematically in FIG. 6. Thus, when the socket assembly 14b is exposed to excessive heat, the retaining sleeve 42b starts to fuse and lose its rigidity. The steel retaining elements 44b can then deform the retaining sleeve 42b to release the plug 12b for movement out of the socket chamber 24b, as shown in FIG. 6. As the plug 12b moves out of the socket chamber 24b, the valve member 30b moves from an open position, through the position shown in FIG. 6, to a closed position to block fluid flow through the socket assembly 14b.

To provide for fusing and subsequent compressing of the sleeve 42b when it is exposed to excessive heat, the sleeve is formed of a polymeric material which loses its rigidity and is reduced to a plastic state when it is heated to a temperature in excess of 200° F. In the illustrated embodiment of the invention, the sleeve element 42b is formed of an acetal plastic, specifically "DELRIN". This specific plastic material fuses at a temperature of approximately 350° F.

It is contemplated that the coupling 10b may be used in environments where fusing of the sleeve element 42b and the resulting closing of the valve assembly 28b occurs at a temperature of 200° F. to 250° F. Under these circumstances, the sleeve element 42b may be formed of an acrylic plastic having the required low fusing temperature. Of course, the sleeve 42b could be formed of other known polymeric materials if desired.

When the plug 12b and socket assembly 14b are interconnected, the metal retaining elements or balls 44b are received in the groove 48b formed in the metal plug 12b. At this time, the sleeve element 50b is rigid. The cylindrical inner side surface 54b of the sleeve 50b abuts the retaining elements 44b to hold them in the groove 48b in the manner illustrated in FIG. 1.

When the socket assembly 14b is exposed to excessive heat, the polymeric material of the sleeve element 50b fuses and loses its rigidity. As the sleeve 50b fuses and loses its rigidity, the force applied against the spherical retaining elements 42b by an annular axially sloping side surface 62b of the groove 48b cams or presses the retaining elements 44b outwardly. As the steel retaining elements 42b move outwardly, they deform the material of the sleeve by indenting the sleeve in the manner illustrated in FIG. 6. Thus, the spherical outer side surfaces of the retaining elements 44b are pressed against the cylindrical inner side surface 54b with sufficient force to deform the sleeve 50b after the material of the sleeve has fused due to exposure to excessive heat.

As the spherical retaining elements 44b move radially outwardly into the retaining sleeve 50b, the retaining elements become disengaged from the annular groove 48b. This allows the valve spring 34b to move the valve member 30b and plug 12b toward the right as viewed in FIG. 6. As this occurs, the valve assembly 28b closes and the plug 12b becomes disengaged from the socket assembly 14b.

In the embodiment of the invention illustrated in FIG. 6, the entire sleeve 50b is formed of a heat fusible material. However, only the portion of the sleeve 50b which is disposed outwardly of the annular array of locking elements 44b needs to be formed of a heat fusible material. The remainder of the sleeve 50b could be formed of metal.

Conclusion

In view of the foregoing description, it is apparent that the present invention provides a new and improved coupling 10 which is used to connect a pair of conduits in fluid communication. Upon being exposed to excessive heat, the coupling 10 interrupts both the physical connection and fluid communication between the conduits. The coupling 10 includes an improved socket assembly 14 having a socket body 22 with a chamber 24 into which a plug 12 is inserted. The socket assembly 14 also has a locking or retaining assembly which retains the plug 12 in the socket body 22.

The retaining assembly 42 includes a plurality of retaining or locking elements 44 which are movable relative to the socket body 22 between an engaged condition and a disengaged condition. When the retaining elements 44 are in the engaged condition, they extend into the chamber 24 in the socket body 22 to engage the plug 12 and retain the plug in the chamber (FIG. 1). When the retaining elements 44 are in the disengaged condition they are ineffective to retain the plug 12 in the socket body 22. A retaining sleeve 50 is axially movable along the socket body 22. As the sleeve 50 moves along the socket body 22, the retaining elements 44 move between the engaged and disengaged conditions.

In accordance with a feature of the invention, at least a portion of the locking or retaining assembly 42 is formed of a heat fusible material. When the coupling 10 is exposed to excessive heat, this material starts to melt or fuse and loses its rigidity. When this occurs, the heat fusible material is deformed and the plug moved at least part way out of the socket chamber 24.

The heat fusible portion of the retaining assembly 42 may be the retaining elements 44. Prior to exposure of excessive heat, the retaining elements 44 transmit force to hold the plug 12 in the chamber 24. When the socket assembly 14 is exposed to excessive heat, the retaining elements 44 fuse and lose their rigidity. When this happens, the force transmitted by the retaining elements 44 deforms the retaining elements (FIG. 2) to release the plug 12.

In the embodiment of the invention illustrated in FIGS. 1-3, the heat fusible retaining elements 44 have a spherical configuration. In the embodiment of the invention illustrated in FIGS. 4 and 5, the heat fusible retaining elements 44a have a cylindrical configuration. Of course, the heat fusible retaining elements could have other configurations if desired, such as the configuration shown in U.S. Pat. No. 3,423,110.

In another embodiment of the invention, the heat fusible portion of the locking or retaining assembly is the sleeve 50b (FIG. 6). Prior to exposure of excessive heat, the sleeve 50b holds the retaining elements 44b in engagement with the plug 12b. When the socket assembly 14b is exposed to excessive heat, at least a portion of the sleeve 50b fuses and loses t rigidity. When this happens, the sleeve 50b is deformed by force transmitted from the plug 12b to the sleeve by the retaining elements 50b (see FIG. 6). As the sleeve 50b is deformed, the retaining elements 44b move from the engaged condition to the disengaged condition.

Having described specific preferred embodiments of the invention, the following is claimed:

1. A socket assembly for receiving a plug to connect a pair of conduits in fluid communication, said socket assembly comprising a socket body having a chamber for receiving the plug, locking means for retaining the plug in the chamber in said socket body, said locking means including a retaining element which is movable relative to said socket body between an engaged condition extending into the chamber in said socket body to engage the plug and retain the plug in the chamber in said socket body and a disengaged condition in which said retaining element is ineffective to retain the plug in the chamber in said socket body, said locking means further including a tubular sleeve element which is movable in an axial direction relative to said socket body by an operator to effect movement of said retaining element from one of said conditions to the other of said conditions, at least a portion of one of said elements of said locking means being a heat fusible element to which force is applied to maintain the plug in the chamber in said socket body against the influence of force tending to separate the plug and said socket body, said one of said elements being fusible upon exposure to excessive heat to enable the plug to be withdrawn from the chamber in said socket body upon exposure of said socket assembly to excessive heat with said retaining element in the engaged condition.

2. A socket assembly as set forth in claim 1 wherein said one of said elements is said sleeve element.

3. A socket assembly as set forth in claim 1 further including a valve member movable between a closed condition blocking fluid flow through the chamber in said socket body and an open condition in which said valve member is ineffective to block fluid flow through the chamber in said socket body, spring means for urging said valve member toward the closed condition, said retaining element being movable relative to said socket body under the influence of force transmitted from said spring means to the plug upon exposure of said socket assembly to excessive heat and fusing of said one of said elements with the plug in the chamber in said socket body.

4. A socket assembly as set forth in claim 3 wherein said one of said elements is said sleeve element, at least portion of said sleeve element being fusible upon exposure to excessive heat.

5. A socket assembly as set forth in claim 1 wherein said of one of said elements is said retaining element.

6. A socket assembly as set forth in claim 5 wherein said retaining element has a spherical configuration.

7. A socket assembly as set forth in claim 5 wherein said retaining element has a generally cylindrical configuration.

8. A coupling for use in connecting a pair of conduits in fluid communication, said coupling comprising a plug adapted to be connected with one of the conduits, a socket body adapted to be connected with another of the conduits, said socket body at least partially defining a socket chamber, said plug being insertable into the socket chamber, spring means providing a force which urges said plug to move out of the socket chamber, a plurality of heat fusible retaining elements mounted on said socket body and engageable with said plug to hold said plug in the socket chamber against the influence of said spring means, said retaining elements being fusible and deformable by said plug and socket body upon exposure to excessive heat to release said plug for movement under the influence of said spring means.

9. A coupling as set forth in claim 8 further including a valve member disposed in said socket body and movable between a closed condition blocking fluid flow through said socket body and an open condition in which said valve member is ineffective to block fluid flow through said socket body, said valve member being urge toward the closed condition by said spring means, said valve member having surface means for transmitting force from said spring means to urge said plug to move out of the socket chamber when said valve member is in the open condition, said retaining elements including surface means for engaging said plug and socket body to transmit force from said plug to said socket body to maintain said plug in said socket body against the influence of said spring means prior to exposure of said coupling to excessive heat.

10. A coupling as set forth in claim 8 wherein said retaining elements are disposed in openings formed in said socket body and project into the socket chamber to engage surface areas of said plug, said retaining elements being subjected to shear stress by forces transmitted between said socket body and plug by said retaining elements, said retaining elements being deformed by the shear stress upon exposure to excessive heat and fusion of said retaining elements.

11. A coupling as set forth in claim 10 wherein said retaining elements have a generally spherical configuration.

12. A coupling as set forth in claim 10 wherein said retaining elements have a generally cylindrical configuration.

13. A socket assembly for receiving a plug to connect a pair of conduits in fluid communication, said socket assembly comprising a socket body having a chamber for receiving the plug, locking means for retaining the plug in the chamber in said socket body, said locking means including a retaining element which is movable relative to said socket body between an engage condition extending into the chamber in said socket body to engage the plug and retain the plug in the chamber in said socket body and a disengaged condition in which said retaining element is ineffective to retain the plug in the chamber in said socket body, said locking means further including a sleeve element which is movable relative to said socket body to effect movement of said retaining element from one of said conditions to the other of said conditions, at least a portion of said retaining element being a heat fusible element to which force is applied to maintain the plug in the chamber in said socket body against the influence of force tending to separate the plug and said socket body, said retaining element being fusible upon exposure to excessive heat to enable the plug to be withdrawn from the chamber in said socket body upon exposure of said socket assembly to excessive heat with said retaining element in the engaged condition.

14. A socket assembly as set forth in claim 13 wherein said retaining element has a spherical configuration.

15. A socket assembly as set forth in claim 13 wherein said retaining element has a generally cylindrical configuration.

16. A socket assembly for receiving a plug to connect a pair of conduits in fluid communication, said socket assembly comprising a socket body having a chamber for receiving the plug, a valve member movable between a closed condition blocking fluid flow through the chamber in said socket body and an open condition in which said valve member is ineffective to block fluid flow through the chamber in said socket body, spring means for urging said valve member toward the closed condition, locking means for retaining the plug in the chamber in said socket body, said locking means including a plurality of retaining elements which are movable relative to said socket body between an engaged condition extending int the chamber in said socket body to engage the plug and retain the plug in the chamber in said socket body and a disengaged condition in which said retaining elements are ineffective to retain the plug in the chamber in said socket body, said locking means further including a sleeve element which is movable relative to said socket body to effect movement of said retaining element from one of said conditions to the other of said conditions, said retaining elements being heat fusible elements to which force is applied to maintain the plug in the chamber is said socket body against the influence of force tending to separate the plug and said socket body, said retaining elements all being formed of a material which fuses upon exposure to excessive heat to enable the plug to be withdrawn from the chamber in said socket body upon exposure of said socket assembly to excessive heat with said retaining elements in the engaged condition, said retaining elements being movable relative to said socket body under the influence of force transmitted from said spring means to the plug upon exposure of said socket assembly to excessive heat and fusing of said retaining elements with the plug in the chamber in said socket body.

17. A coupling for use in connecting a pair of conduits in fluid communication, said coupling comprising a plug adapted to be connected with one of the conduits, a socket body adapted to be connected with another of the conduits, said socket body at least partially defining a socket chamber, said plug being insertable into the socket chamber, spring means providing force which urges said plug out of the socket chamber, a retaining element mounted on said socket body, said retaining element being movable relative to said socket body between a disengaged condition in which said retaining element is ineffective to hold said plug in the socket chamber and engaged condition in which said retaining element projects into the socket chamber and engages said plug to hold said plug in the socket chamber against the influence of said spring means, said plug including surface means which applies force against said retaining element urging said retaining element toward the disengaged condition when said retaining element is in the engaged condition, and a tubular sleeve for holding said retaining element in the engaged condition against the influence of the force applied to the retaining element by said surface means, said sleeve being movable in an axial direction relative to said socket body by an operation to release said retaining element for movement from the engaged condition to the disengaged condition, said sleeve being fusible and deformable by said retaining element upon exposure to excessive heat to release said retaining element for movement from the engaged condition to the disengaged condition under the influence of force applied against said retaining element by said surface means.

18. A coupling as set forth in claim 17 wherein said sleeve is entirely formed of material which is fusible upon exposure to excessive heat.

19. A coupling as set forth in claim 17 further including a plurality of retaining elements, all of said retaining elements being disposed in a circular array which is circumscribed by said sleeve.

* * * * *

UNITED STATES PATENT AND TRADEMARK OFFICE
CERTIFICATE OF CORRECTION

PATENT NO. : 4,825,893

DATED : May 2, 1989

INVENTOR(S) : Edward D. Gailey

It is certified that error appears in the above-identified patent and that said Letters Patent is hereby corrected as shown below:

Column 14, Line 24, insert --an-- between "and" and "engaged"

Column 14, Line 36, change "operation" to --operator--

Signed and Sealed this

Twenty-seventh Day of March, 1990

Attest:

JEFFREY M. SAMUELS

*Attesting Officer*   *Acting Commissioner of Patents and Trademarks*